(12) United States Patent
Hsu et al.

(10) Patent No.: US 7,086,772 B2
(45) Date of Patent: Aug. 8, 2006

(54) LIGHT GUIDE PLATE WITH REFLECTION LUMPS AND ROUND PROTRUSIONS AND PLANE LIGHT SOURCE USING THE SAME

(75) Inventors: Mu-Chi Hsu, Tu-chen (TW); Chien-Min Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 220 days.

(21) Appl. No.: 10/737,436

(22) Filed: Dec. 15, 2003

(65) Prior Publication Data
US 2004/0263717 A1  Dec. 30, 2004

(30) Foreign Application Priority Data
Dec. 13, 2002  (TW) .............................. 91136037 A

(51) Int. Cl.
*F21V 7/04* (2006.01)
(52) U.S. Cl. .................. 362/619; 362/625; 349/65
(58) Field of Classification Search .............. 362/613, 362/619, 620, 623, 625, 626; 349/64, 65
See application file for complete search history.

(56) References Cited

U.S. PATENT DOCUMENTS

| | | | | |
|---|---|---|---|---|
| 5,921,651 | A * | 7/1999 | Ishikawa | 362/624 |
| 6,425,673 | B1 * | 7/2002 | Suga et al. | 362/613 |
| 6,447,135 | B1 * | 9/2002 | Wortman et al. | 362/623 |
| 6,811,275 | B1 * | 11/2004 | Suzuki et al. | 362/613 |

* cited by examiner

*Primary Examiner*—Stephen F Husar
(74) *Attorney, Agent, or Firm*—Wei Te Chung

(57) ABSTRACT

A plane light source has a light source (50), a reflection cover (51) and a light guide plate (10). The light guide plate has a wedge-shaped base plate (20), an array of reflection lumps (30), and an array of round protrusions (40). The base plate has a light incidence surface (21), a light emitting surface (23), and a bottom surface (25) opposite to the light emitting surface. The reflection lumps are disposed on the bottom surface, and penetrate into the base plate. The round protrusions are disposed on the light emitting surface for diffusing light. Each reflection lump corresponds to a respective one of the round protrusions. Each reflection lump has a reflecting surface (301) for reflecting incident light to the corresponding round protrusion of the light emitting surface.

18 Claims, 2 Drawing Sheets

LIGHT GUIDE PLATE WITH REFLECTION LUMPS AND ROUND PROTRUSIONS AND PLANE LIGHT SOURCE USING THE SAME

BACKGROUND OF THE INVENTION

1. Field of the Invention

The present invention relates to a light guide plate used in a liquid crystal display (LCD), and to a plane light source using the light guide plate.

2. Description of Prior Art

In a backlight type liquid crystal display (LCD), a plane light source (or "backlight system") is used to provide bright and uniform illumination. Generally, the backlight system comprises a light source, a reflection plate, a light guide plate, a diffusing plate, and a prism layer. The light guide plate is a key component of the backlight system, and includes one or more light incidence surfaces and a light emitting surface. The diffusing plate is usually disposed on the light emitting surface, in order to make the light more uniform.

FIG. 4 shows a light guide plate 100 as disclosed in Taiwan patent No. 487170 issued on May 11, 2002. The light guide plate 100 comprises a base plate 110 and a plurality of round protrusions 120. The base plate 110 has a light incidence surface 111, a light emitting surface 113, and a bottom surface 115 opposite to the light emitting surface 113. The protrusions 120 are disposed on the light emitting surface 113.

The protrusions of the light guide plate 100 can diffuse incident light rays, so that light emitted from the light guide plate 100 is more uniform. However, this configuration does not improve the brightness of outgoing light. The brightness of outgoing light is perhaps equally important or even more important than the uniformity of outgoing light.

It is desirable to provide a light guide plate and a plane light source incorporating the light guide plate which make good the above-described deficiency.

SUMMARY OF THE INVENTION

An object of the present invention is to provide a light guide plate which enhances the brightness and uniformity of outgoing light rays.

Another object of the present invention is to provide a plane light source which enhances the brightness and uniformity of outgoing light rays.

A light guide plate of the present invention comprises a wedge-shaped base plate, an array of reflection lumps, and an array of round protrusions. The base plate comprises a light incidence surface, a light emitting surface, and a bottom surface opposite to the light emitting surface. The reflection lumps are disposed on the bottom surface, and penetrate into the base plate. The round protrusions are disposed on the light emitting surface for diffusing light. Each reflection lump corresponds to a respective one of the round protrusions. Each reflection lump has a reflecting surface for reflecting incident light to the corresponding round protrusion of the light emitting surface.

A plane light source of the present invention comprises a light source and a light guide plate. The light guide plate comprises a wedge-shaped base plate, an array of reflection lumps, and an array of round protrusions. The base plate comprises a light incidence surface, a light emitting surface, and a bottom surface opposite to the light emitting surface. The reflection lumps are disposed on the bottom surface, and penetrate into the base plate. The round protrusions are disposed on the light emitting surface for diffusing light. Each reflection lump corresponds to a respective one of the round protrusions. Each reflection lump has a reflecting surface for reflecting incident light to the corresponding round protrusion of the light emitting surface.

Because incident light is reflected by the reflecting surfaces of the reflection lumps on the bottom surface, the efficiency of utilization of light is enhanced, and so is the brightness. In addition, the round protrusions disposed on the light emitting surface serve as light diffusers, so that outgoing light from the light guide plate is more uniform.

Other objects, advantages, and novel features of the present invention will become more apparent from the following detailed description when taken in conjunction with the accompanying drawings, in which:

DETAILED DESCRIPTION OF THE INVENTION

Figure 1:
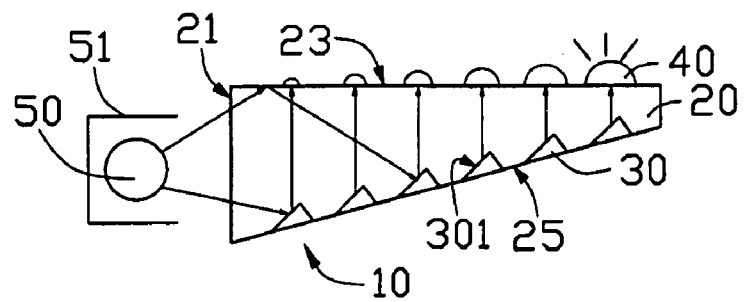
FIG. 1 is a schematic, cross-sectional view of a plane light source according to a first embodiment of the present invention, showing light paths thereof.

Referring to FIG. 1, a plane light source according to a first embodiment of the present invention comprises a light source 50, a reflection cover 51 and a light guide plate 10. The light guide plate 10 comprises a wedge-shaped base plate 20, an array of reflection lumps 30, and an array of round protrusions 40. The base plate 20 is made of glass or another transparent material, and comprises a light incidence surface 21, a light emitting surface 23 and a bottom surface 25 opposite to the light emitting surface 23. Each of the reflection lumps 30 corresponds to a respective one of the round protrusions 40, and comprises a reflecting surface 301.

The light source 50 is disposed adjacent the light guide plate 10, and faces the light incidence surface 21 of the base plate 20. The light source 50 can be a linear light source such as a CCFL (Cold Cathode Fluorescent Lamp), or a point light source such as an LED (Light Emitting Diode). The reflection cover 51 is disposed around three sides of the light source 50, to reflect light into the light incidence surface 21. The reflection lumps 30 are uniformly disposed on the bottom surface 25, and penetrate into the base plate 20 to a same depth. The reflecting surfaces 301 are for reflecting incident light to the light emitting surface 23. The round protrusions 40 are disposed on the light emitting surface 23 for diffusing light. Sizes of the round protrusions 40 progressively increase with increasing distance from the light incidence surface 21.

Incident light is reflected by the reflecting surfaces 301 of the reflection lumps 30 on the bottom surface 25. The efficiency of utilization of light is enhanced, and so is the brightness. In addition, the round protrusions 40 of varying sizes disposed on the light emitting surface 23 serve as light diffusers, so that outgoing light from the light guide plate 10 is more uniform.

Figure 2:
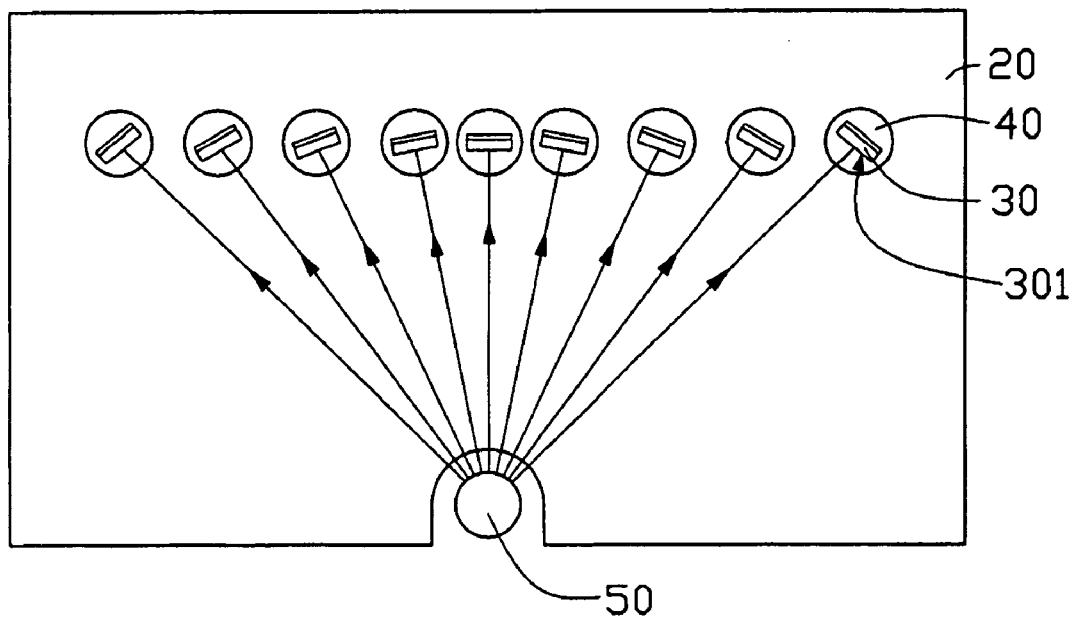
FIG. 2 is a schematic, top elevation of a plane light source according to a second embodiment of the present invention, showing light paths thereof.

Referring to FIG. 2, a plane light source according to a second embodiment of the present invention is similar to that of the first embodiment. The base plate 20 is wedge-shaped, and is made of glass or another transparent material. The light source 50 is a point light source such as an LED. The light beams emitted by the light source 50 enter the light guide plate 20. Each of the reflection lumps 30 corresponds to a respective one of the round protrusions 40. The reflecting surface 301 of each reflection lump 30 is oriented perpendicular to corresponding incident light beams. This configuration assures that all applicable incident light beams readily reach the reflecting surfaces 301 of the reflection lumps 30. Accordingly, an entire area of the light emitting surface 23 can have uniform and bright illumination.

The base plate 20 may alternatively have a rectangular cross-section.

Figure 3:
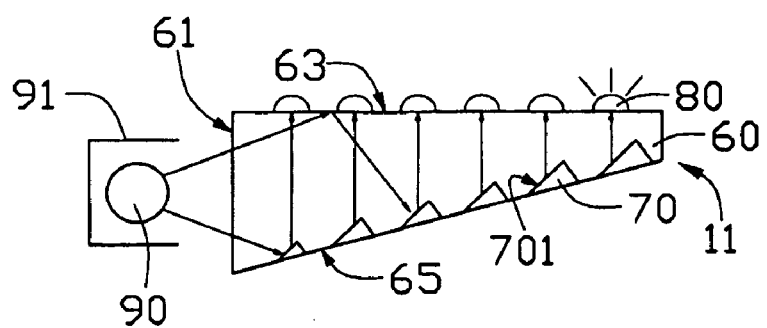
FIG. 3 is a schematic, cross-sectional view of a plane light source according to a third embodiment of the present invention, showing light paths thereof.
Figure 4:
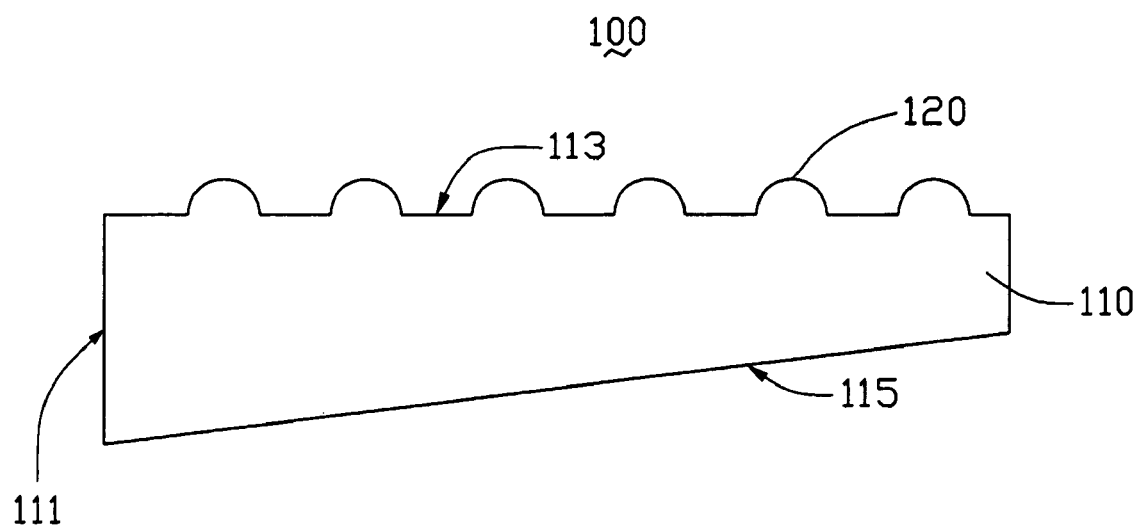
FIG. 4 is a side elevation of a conventional light guide plate.

Referring to FIG. 3, a plane light source according to a third embodiment of the present invention comprises a light source 90, a reflection cover 91 and a light guide plate 11. The light guide plate 11 comprises a wedge-shaped base plate 60, an array of reflection lumps 70, and an array of round protrusions 80. The base plate 20 is made of glass or another transparent material, and comprises a light incidence surface 61, a light emitting surface 63 and a bottom surface 65 opposite to the light emitting surface 63. Each of the reflection lumps 70 corresponds to a respective one of the round protrusions 80, and comprises a reflecting surface 701.

Compared with the plane light source of the first embodiment, the plane light source of the third embodiment has the following two features. Firstly, the round protrusions 80 are all the same size. Secondly, the reflection lumps 70 are uniformly disposed on the bottom surface 65, but are differently sized. That is, the reflection lumps 70 progressively penetrate into the base plate 60 deeper and deeper with increasing distance away from the light incidence surface 61.

The configuration of the reflection lumps 70 enables light beams coming from the light incident surface 61 to be directed to the light emitting surface 63 more uniformly. Thus outgoing light from the light guide plate 11 is more uniform.

The respective sizes, shapes and positions of the above-described reflection lumps 30, 70 and round protrusions 40, 80 may be varied, combined and coordinated according to the actual requirements of particular applications.

It is also to be generally understood that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light guide plate, comprising:
    a base plate comprising a light incidence surface, a light emitting surface and a bottom surface opposite to the light emitting surface; and
    an array of reflection lumps disposed on the bottom surface and penetrating into the base plate, each of the reflection lumps having a reflecting surface for reflecting incident light to the light emitting surface; and
    an array of diffusion protrusions uniformly disposed on the light emitting surface for diffusing light, wherein sizes of the diffusion protrusions progressively increase with increasing distance away from the light incidence surface.

2. The light guide plate as claimed in claim 1, wherein each of the reflection lumps corresponds to a respective diffusion protrusion.

3. The light guide plate as claimed in claim 2, wherein the reflecting surface of each of the reflection lumps is oriented perpendicular to corresponding incident light beams.

4. The light guide plate as claimed in claim 1, wherein the reflection lumps are uniformly disposed on the bottom surface, and penetrate into the base plate to a same depth.

5. The light guide plate as claimed in claim 1, wherein the diffusion protrusions are uniformly disposed on the light emitting surface and are all the same size.

6. The light guide plate as claimed in claim 5, wherein the reflection lumps are uniformly disposed on the bottom surface, and progressively penetrate into the base plate deeper and deeper wit increasing distance away from the light incidence surface.

7. The light guide plate as claimed in claim 1, wherein the base plate is wedge-shaped.

8. A plane light source, comprising:
    a light source; and
    a light guide plate comprising: a base plate, an array of reflection lumps and an array of diffusion protrusions; wherein the base plate comprises a light incidence surface, a light emitting surface and a bottom surface opposite to the light emitting surface; the reflection lumps are disposed on the bottom surface and penetrate into the base plate; each of the reflection lumps has a reflecting surface for reflecting incident light to the light emitting surface; the diffusion protrusions are disposed on the light emitting surface for diffusing light; and each of the reflection lumps corresponds to a respective diffusion protrusion.

9. The plane light source as claimed in claim 8, further comprising a reflection cover to reflect light emitted from the light source to the light guide plate.

10. The plane light source as claimed in claim 8, wherein the light source is a linear light source.

11. The plane light source as claimed in claim 8, wherein the light source is a point light source.

12. The plane light source as claimed in claim 8, wherein the reflecting surface of each of the reflection lumps is oriented perpendicular to corresponding incident light beams.

13. The plane light source as claimed in claim 8, wherein the reflection lumps are uniformly disposed on the bottom surface, and penetrate into the base plate to a same depth.

14. The plane light source as claimed in claim 13, wherein the diffusion protrusions are uniformly disposed on the light emitting surface, and sizes of the diffusion protrusions progressively increase with increasing distance away from the light incidence surface.

15. The plane light source as claimed in claim 8, wherein the diffusion protrusions are uniformly disposed on the light emitting surface and are all the same size.

16. The plane light source as claimed in claim 15, wherein the reflection lumps are uniformly disposed on the bottom surface, and progressively penetrate into the base plate deeper and deeper with increasing distance away from the light incidence surface.

17. A light guide plate assembly comprising:
    a light source;
    a light guide plate positioned beside said light source and comprising:

a base plate defining opposite light emitting surface and light reflection surface;

an array of reflection lumps positioned on the light reflection surface;

an array of diffusion protrusions positioned on the light emitting surface; and the reflection lumps and the diffusion protrusions being in a one-to-one relation mutually and essentially aligned wit each other in a vertical direction of said light emitting surface.

18. The light guide plate assembly as claimed in claim 17, wherein the array of the reflection lumps are arranged in a sector manner and a light source is located in a center position thereof, and each of said reflection lumps defines a reflection surface intentionally tilted toward the light source so as to generally align with corresponding radial directions, respectively.

* * * * *